United States Patent [19]

Giannuzzi

[11] Patent Number: 4,838,746
[45] Date of Patent: Jun. 13, 1989

[54] BREAK-AWAY RIVET CONFIGURATION

[75] Inventor: Ottavio Giannuzzi, Baldwin, N.Y.

[73] Assignee: Grumman Aerospace Corporation, Bethpage, N.Y.

[21] Appl. No.: 143,095

[22] Filed: Jan. 12, 1988

[51] Int. Cl.⁴ ............................................. F16B 19/06
[52] U.S. Cl. ..................................... 411/504; 411/5
[58] Field of Search ................... 411/2, 3, 5, 34, 43, 411/500, 501, 504

[56] References Cited

U.S. PATENT DOCUMENTS

| | | |
|---|---|---|
| 162,643 | 4/1875 | Goddu . |
| 182,495 | 9/1876 | Trask . |
| 190,575 | 5/1877 | Goddu . |
| 341,413 | 5/1886 | Fowler . |
| 1,072,212 | 9/1913 | Dobyne . |
| 1,584,337 | 5/1926 | Warne . |
| 2,366,510 | 1/1945 | Frank . |
| 2,948,056 | 8/1960 | Muenchinger . |
| 3,038,626 | 6/1962 | Simmons ............................. 411/43 |
| 3,257,890 | 6/1966 | Kraemer ............................. 411/43 |
| 3,941,027 | 3/1976 | Gibson, Jr. et al. ................ 411/43 |
| 4,324,518 | 4/1982 | Dixon . |
| 4,541,761 | 9/1985 | Bryce, Jr. . |

FOREIGN PATENT DOCUMENTS

| | | | |
|---|---|---|---|
| 200400 | 11/1986 | European Pat. Off. ............. 411/43 |
| 106169 | 5/1917 | United Kingdom ................ 411/43 |
| 768850 | 2/1957 | United Kingdom ................ 411/43 |

Primary Examiner—Neill R. Wilson
Attorney, Agent, or Firm—Pollock, VandeSande & Priddy

[57] ABSTRACT

An elongated break-away rivet includes a main body and a tapered extension joined along a break-away plane. The elongated rivet minimizes rivet tumble along a delivery path which terminates at a work piece. At the end of the path, a tool impacts against the extension thereby causing it to break away and leaving a finished rivet of length appropriate for the work piece.

1 Claim, 1 Drawing Sheet

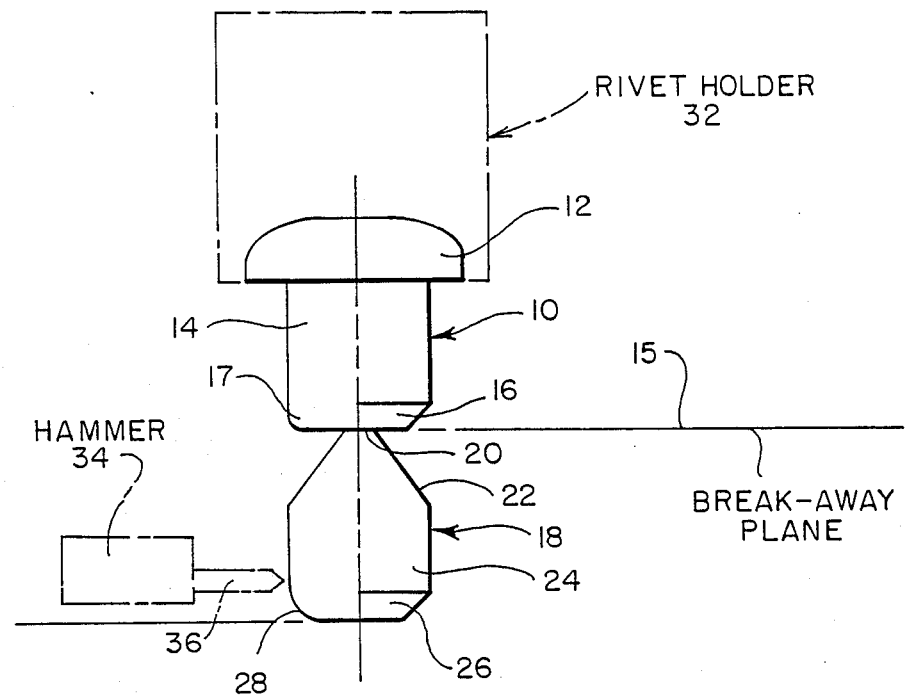

BREAK-AWAY RIVET CONFIGURATION

FIELD OF THE INVENTION

The present invention relates to rivets, and more particularly to a rivet having a section thereof designed for separation from the main rivet body prior to insertion.

BACKGROUND OF THE INVENTION

In the fastening of metallic members, rivets are still popular due to their fastening strength. In the aircraft industry the rivet is widely used for fastening aircraft skin sections to the aircraft frame. As the utilization of robotics increases in the aircraft industry, it is becoming more common to deliver rivets over a relatively long distance from a supply to a rivet holder adjacent a robotic arm.

It has been found that, when the ratio of rivet length to diameter approaches unity, the rivet is likely to tumble as it traverses a delivery path. The problem which this poses relates to the change in orientation of a rivet, after tumbling, so that the rivet may not be in a proper position at the delivery end of the delivery path. An obvious solution is to provide a rivet with a longer length so as to minimize the likelihood of tumbling. However, the thickness of the material through which the rivet must pass determines the assembly length of the rivet and this cannot be altered to achieve the anti-tumbling effect.

BRIEF DESCRIPTION OF THE INVENTION

The present invention seeks to accomplish two objectives simultaneously. The first objective is to create a rivet having a length far greater than its diameter so as to minimize the likelihood of tumbling. However, at the same time the assembly length of the rivet, as it is to be inserted in material, will be smaller than the initial length of the rivet as it is delivered to a riveting point.

In order to obtain the simultaneous objectives, the present invention offers a break-away rivet construction which, in an original state and as delivered to a riveting point, has a length far greater than its diameter. A necked-down area is created along an intermediate distance of the rivet and is characterized by an undercut. At the terminal point of the delivery path and prior to insertion of the rivet into a work piece, the rivet portion having the necked-down area is broken off thereby leaving a finished rivet having appropriate length for receipt in a work piece. Accordingly, the rivet configuration of the present invention accomplishes the two objectives set forth above, namely, a length-diameter ratio which minimizes the likelihood of tumbling along a delivery path, and the creation of a final rivet length which will not be too long for a work piece into which the rivet is to be received.

BRIEF DESCRIPTION OF THE FIGURE

The above-mentioned objects and advantages of the present invention will be more clearly understood when considered in conjunction with the accompanying drawings, in which:

The FIGURE is an elevational view of the present invention illustrating the unique rivet configuration.

DETAILED DESCRIPTION OF THE INVENTION

Referring to the FIGURE, reference numeral 10 generally indicates the break-away rivet of the present invention. The rivet is seen to include a head 12 which may be of conventional shape. The body of the rivet includes a normal cylindrical section 14 which tapers, at a cut-off plane 15, to a chamfered end 16 or radius end 17. Thus far described, the rivet resembles a conventional rivet.

The inventive aspect of the present invention is the addition of an integral extension generally indicated by reference numeral 18. This extension has the same outer diameter as cylindrical section 14 so that a supply and delivery system for ordinary rivets can handle the present rivet. The extension 18 has a necked-down area or junction 20 with the confronting end of cylindrical section 14. The necked-down area then gradually tapers outwardly to a frusto-conical section 22 thereby creating an undercut in the overall rivet. The purpose of this undercut is to permit the breaking away of extension 18, along the cut-off plane 15, after the rivet is delivered to a work piece. As previously mentioned, the cylindrical section 24 of the extension 18 is intended to have the same diameter as the cylindrical section 14 of the upper rivet body although this is not critical and may be changed for different applications. The bottom end section of extension 18 may again be finished with a chamfer 26 or rounded with a simple radius 28.

The rivet configuration shown in the figure is the configuration supplied and delivered to a work piece. With the extended length of the rivet, the likelihood of tumbling along a delivery path is minimized. However, at the end of the delivery path, a rivet holder, schematically illustrated at 32, grips the rivet head 12; and prior to being lowered into a work piece hole, the extension 18 must be sheared from the gripped rivet. In order to accomplish this, a mechanical or electric hammer 34 may be appropriately positioned so that its tool head 36 impacts against the extension 18 and causes the extension to break away. Other types of automatic or manual methods may be employed to shear off the extension 18. After the extension is sheared off, the remaining rivet will appear with the desired assembly length governed by the length of cylindrical section 14.

Accordingly, the present invention allows automatic rivet delivery systems to handle rivets properly, without tumbling. The present rivet configuration is simply and inexpensively manufactured and greatly increases the flexibility of rivets to be employed with robotics.

It should be understood that the invention is not limited to the exact details of construction shown and described herein for obvious modifications will occur to persons skilled in the art.

I claim:

1. A rivet configuration comprising:
a head;
a first cylindrical section extending from the head to an outer end section;
an integral extension coaxial with the first cylindrical section to form an overall rivet length exceeding the diameter of the rivet, the extension having a necked-down section joined to the outer end section of the first cylindrical section along a plane, the necked-down section being frusto-conical and non-symmetric with respect to the outer end section; and having a longer length and greater undercut angle than the outer end section, with respect to the plane, for permitting the integral extension to break away cleanly from the first cylindrical section along the plane upon receipt of impact.

* * * * *